(12) United States Patent
Gabrielson

(10) Patent No.: US 9,231,948 B1
(45) Date of Patent: Jan. 5, 2016

(54) TECHNIQUES FOR PROVIDING REMOTE COMPUTING SERVICES

(71) Applicant: Amazon Technologies, Inc., Reno, NV (US)

(72) Inventor: Jacob Gabrielson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 81 days.

(21) Appl. No.: 14/088,200

(22) Filed: Nov. 22, 2013

Related U.S. Application Data

(63) Continuation of application No. 12/886,852, filed on Sep. 21, 2010, now Pat. No. 8,595,806.

(51) Int. Cl.
*G06F 15/16* (2006.01)
*H04L 29/06* (2006.01)

(52) U.S. Cl.
CPC ................... *H04L 63/0876* (2013.01)

(58) Field of Classification Search
USPC ............................................ 726/7
See application file for complete search history.

(56) References Cited

U.S. PATENT DOCUMENTS

| | | | |
|---|---|---|---|
| 5,642,420 A * | 6/1997 | Kuroda et al. ................. 380/30 |
| 5,832,483 A | 11/1998 | Barker |
| 5,862,339 A | 1/1999 | Bonnaure et al. |
| 5,889,942 A | 3/1999 | Orenshteyn |
| 6,021,495 A | 2/2000 | Jain et al. |
| 6,226,750 B1 | 5/2001 | Trieger |
| 6,973,499 B1 | 12/2005 | Peden et al. |
| 7,146,009 B2 | 12/2006 | Andivahis et al. |
| 7,194,763 B2 | 3/2007 | Potter et al. |
| 7,363,363 B2 * | 4/2008 | Dal Canto et al. ............ 709/223 |
| 7,509,491 B1 * | 3/2009 | Wainner et al. ............... 713/163 |
| 7,610,390 B2 * | 10/2009 | Yared et al. ................... 709/229 |
| 7,647,522 B2 | 1/2010 | Meijer et al. |
| 7,802,085 B2 | 9/2010 | Graunke |
| 7,992,194 B2 * | 8/2011 | Damodaran et al. ............ 726/4 |
| 8,181,010 B1 | 5/2012 | Uchil et al. |
| 8,214,890 B2 * | 7/2012 | Kirovski et al. ................ 726/12 |
| 8,307,411 B2 * | 11/2012 | Baron et al. ..................... 726/5 |
| 8,462,955 B2 * | 6/2013 | Ureche et al. ................ 380/281 |
| 8,595,806 B1 | 11/2013 | Gabrielson |
| 8,627,493 B1 * | 1/2014 | Chickering et al. ............ 726/27 |
| 8,654,971 B2 * | 2/2014 | Orsini et al. .................... 380/33 |
| 8,667,269 B2 * | 3/2014 | Schibuk ........................ 713/156 |
| 8,732,182 B2 * | 5/2014 | Bethlehem et al. .......... 707/758 |
| 8,788,825 B1 * | 7/2014 | Le et al. ........................ 713/171 |

(Continued)

OTHER PUBLICATIONS

U.S. Appl. No. 12/886,852, "Non-Final Office Action", Oct. 10, 2012, 46 pages.

(Continued)

*Primary Examiner* — Melvin H Pollack
(74) *Attorney, Agent, or Firm* — Kilpatrick Townsend & Stockton LLP

(57) ABSTRACT

Techniques, including systems and methods, for providing access to remote computing services are described and suggested herein. In an embodiment, a first computer system provides a key to a user device over a network. The user device provides the received key to a second computer system that uses the key to authenticate the user device. The second computer system executes an operating system for the user device according to instructions received from the user device. Results of execution of the operating system are provided to the user device.

25 Claims, 6 Drawing Sheets

(56) References Cited

U.S. PATENT DOCUMENTS

| | | | | |
|---|---|---|---|---|
| 8,799,649 | B2* | 8/2014 | Eyal et al. | 713/156 |
| 8,806,481 | B2* | 8/2014 | Ali et al. | 718/1 |
| 8,856,901 | B2* | 10/2014 | Os et al. | 726/7 |
| 8,874,914 | B2* | 10/2014 | Stauth et al. | 713/170 |
| 8,875,242 | B2* | 10/2014 | Choi et al. | 726/4 |
| 8,918,848 | B2* | 12/2014 | Sharma et al. | 726/6 |
| 8,953,805 | B2* | 2/2015 | Tsuruoka et al. | 380/279 |
| 8,958,562 | B2* | 2/2015 | Spies et al. | 380/279 |
| 8,973,122 | B2* | 3/2015 | Beck et al. | 726/9 |
| 8,984,613 | B2* | 3/2015 | Grobman | 726/10 |
| 8,990,569 | B2* | 3/2015 | Haynes et al. | 713/171 |
| 2002/0046341 | A1 | 4/2002 | Kazaks et al. | |
| 2003/0002668 | A1 | 1/2003 | Graunke et al. | |
| 2003/0177385 | A1 | 9/2003 | Price et al. | |
| 2003/0204708 | A1 | 10/2003 | Hulme et al. | |
| 2005/0114694 | A1 | 5/2005 | Wager et al. | |
| 2007/0192420 | A1* | 8/2007 | Vaughn | 709/206 |
| 2011/0185407 | A1* | 7/2011 | Perrot | 726/6 |
| 2011/0202916 | A1* | 8/2011 | VoBa et al. | 718/1 |
| 2012/0011578 | A1* | 1/2012 | Hinton et al. | 726/8 |
| 2014/0365770 | A1* | 12/2014 | Abuan et al. | 713/168 |
| 2015/0096010 | A1* | 4/2015 | Pollutro et al. | 726/13 |

OTHER PUBLICATIONS

U.S. Appl. No. 12/886,852, "Notice of Allowance", Jul. 26, 2013, 8 pages.

* cited by examiner

TECHNIQUES FOR PROVIDING REMOTE COMPUTING SERVICES

CROSS-REFERENCES TO RELATED APPLICATIONS

This application is a continuation of U.S. patent application Ser. No. 12/886,852, filed Sep. 21, 2010, titled "TECHNIQUES FOR PROVIDING REMOTE COMPUTING SERVICES", the full disclosure of which is incorporated herein by reference.

BACKGROUND

Applications and services are often made available over the Internet or other networks. Content, application, and/or service providers often utilize remote computing services where remote computing is an approach to providing access to electronic resources through services, such as Web services. Electronic resources include processors, memory, and, generally, any hardware used in a computing environment. Often hardware and/or software used to support those services is dynamically scalable to meet the needs of the services at any given time. Users, for example, may rent, lease, or otherwise pay for access to remote computing resources, and thus require ownership of less local hardware and/or software than would be required without remote computing services. In addition, often remote computing resources are shared such that, for instance, if one user is not using a processor, another user may.

Historically, users of computing resources have generally utilized local computing resources, that is, resources locally managed on or in connection with user devices, such as notebook and/or desktop computers. Common applications, such as word processing applications, for example, often execute locally on a user's computer, such as a work or home computer. As such, users (or organizations associated with the users) often pay for expensive hardware required for executing the applications and, if necessary, for the maintenance and upgrade of the hardware. Much of this hardware, however, often goes unused. A processor on a person's computer, for example, often operates minimally, if at all, while the user is not using the computer. Thus, remote computing services have the potential to provide more effective use of computing resources.

DETAILED DESCRIPTION

Figure 1:
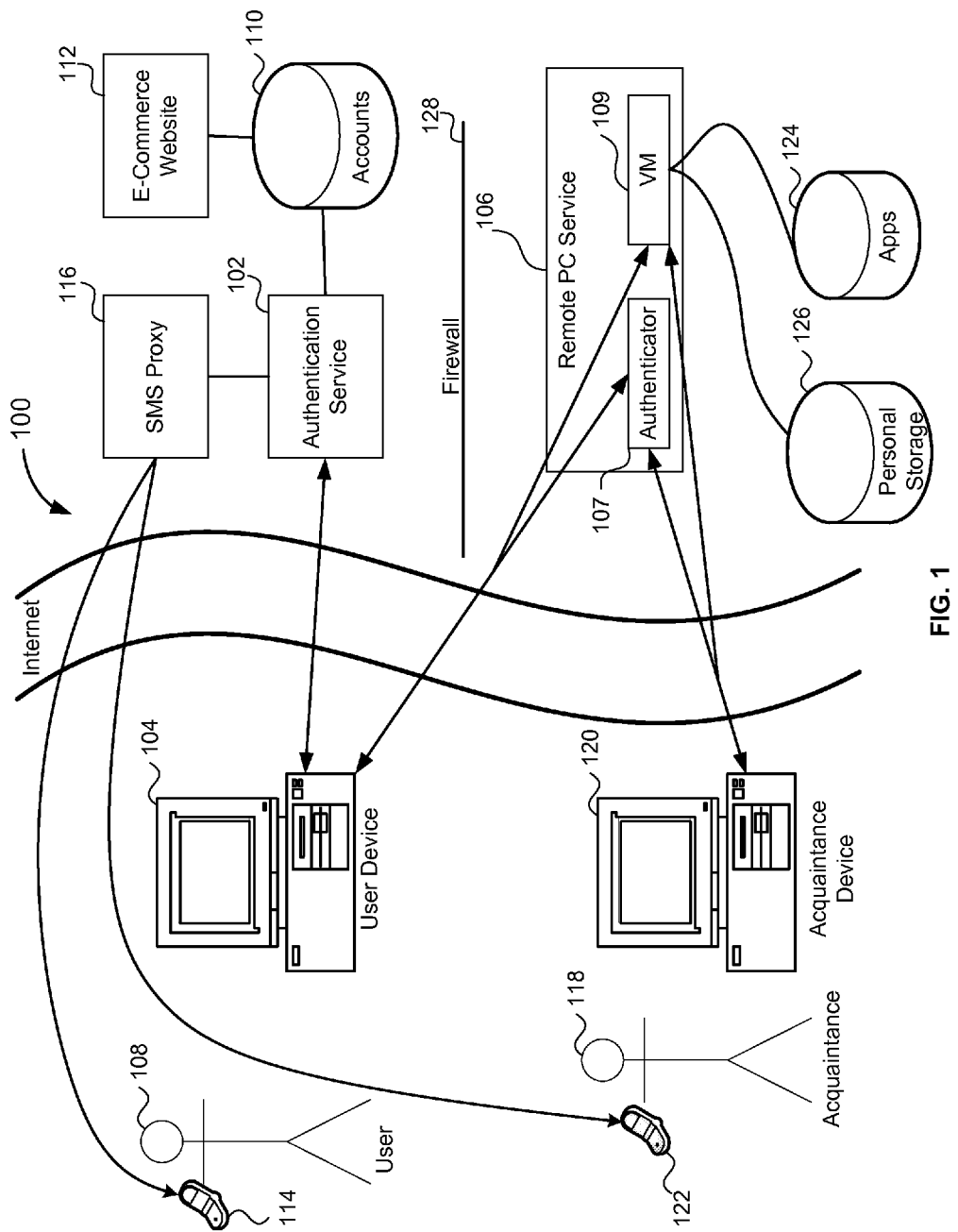
FIG. 1 illustrates an environment in which various embodiments can be implemented and that emphasizes various aspects of the present disclosure.

Techniques, including systems and methods, for facilitating use of computing services are described and suggested herein. In an embodiment, a user device establishes communication with an authentication system or service. The user device may be a device operable to execute an embedded remote desktop client application, and/or a web browser application. The user device may be a device specifically adapted to access remote computing services, such as a liquid crystal display (LCD) monitor with an embedded computing device that is capable of connecting with a virtual machine executing on a remote computing device. A user device may have an embedded key or identifier that the user device sends to the authentication service for authentication. The key may be encoded on hardware that is physically attached to or otherwise incorporated with the user device, such as by welding, glue, or another such attachment mechanism.

The authentication service, in an embodiment, is operable to receive information (key or other identifier) from the user device in order to authenticate the user device. The authentication service may have access to a data store that contains information about the user. For example, the user may have an account with an electronic commerce website. The authentication service may have access to a data store that has information about the user stored in connection with the electronic commerce website. When the authentication service authenticates the user device, the authentication service sends an access key for accessing a remote computing service to the user device, in an embodiment. Upon receiving the access key from the authentication service, the user device may send the received access key to a remote computing service. The remote computing service may be operable to execute a virtual machine on behalf of the user. The virtual machine may be used to execute an operating system and applications installed in the operating system. The remote computing service, in order to provide access to the virtual machine, in an embodiment, authenticates the user device using the key received from the user device.

Once the remote computing service has authenticated the user device, in an embodiment, the remote computing service allows the user device to access a virtual machine executing on behalf of the user. From the user's point of view, the user may see, hear, and otherwise experience the results of execution of the operating system and applications on the virtual machine as if the operating system and/or applications were executing on the user device. For instance, upon the remote computing service granting access to the user device, the user device may display a login screen for the operating system that the user may use to access features of the operating system. Similarly, the user may use a word processing application to compose a document, where the word processing application executes on the virtual machine of the remote computing service, but where the user experiences an interface of the word processing application as if the word processing application is executing on the user device.

Other various embodiments are also described and suggested herein. For instance, in an embodiment, a second key is sent from the authentication service to the user in one or more ways. For instance, an short message service (SMS) message with a second key may be sent to a mobile device of the user. An electronic mail message with a second key may be sent to an electronic mail address of the user that the user may access with his or her mobile device or with another device. The user may provide the second key to the remote computing service to enable the remote computing service to authenticate the user device using both the key received from the user device and the second key provided to the user. In this manner, additional authentication steps provide an increased level of security to insure against unauthorized use of the user device.

In one embodiment, a user is able to instruct the authentication service (or the remote computing service) to provide an acquaintance key to an acquaintance of the user who may be a friend, relative, technician, or, generally, any person to whom the user wishes to grant access to the virtual machine. The acquaintance may use the acquaintance key (and possible additional keys provided to the acquaintance) to access the remote computing service in accordance with the various embodiments described herein. Multiple acquaintances may be provided keys to allow simultaneous access to the virtual machine by many people, such as students in a class. Keys provided to acquaintances, and keys provided in general, may have various limitations associated with them. For instance, a key may be valid for a limited time or for a certain level of access to the virtual machine. Other variations and details of the various embodiments are provided below.

FIG. 1 shows an illustrative example of an environment 100 for providing remote computing services. In an embodiment, the environment 100 includes an authentication service 102 with which a user device 104 communicates. Communication between the authentication service 102 and the user device 102 may occur over the Internet or other communications network or combination of networks. The authentication service 104, in an embodiment, may be hardware or a module executing on hardware that is operable to provide, directly or indirectly, a key to the user device 104. The user device 104 may be any device operable to provide information (such as on a display) and communicate over a communications network. Example user devices include, but are not limited to, personal computers, laptop or notebook computers, mobile computing devices, tablet or slate computing devices, terminal devices, and, generally, any device suitable for providing information to a user and communicating over a network in accordance with various embodiments described and suggested herein. In an embodiment, the user device 104 includes a remote desktop client application that causes a display of the user device 104 to change based at least in part on operation of a remote computing instance executing remotely, as described below. Also, in an embodiment, the user device 104 detects a network connection and sends a key request to the authentication service 102. The key request may include data derived from information permanently embedded in the user device 104. For instance, the data derived from the information permanently embedded in the user device 104 may be data derived from a unique identifier of the user device 104, discussed below. In an embodiment, the data derived from the information permanently embedded in the user device 104 may be data that encodes the unique identifier for transmission to the authentication service 102.

The key provided to the user device 104 by the authentication service 102 may be a key that enables, at least in part, the user device 104 to access a remote computing service 106, as described in more detail below. As noted, in an embodiment, the user device 104 has a unique identifier associated with a user 108 of the user device 104 in a data store 110 that is communicatively connected with the authentication service 102. The unique identifier may be permanently manufactured into a chip of the user device 104, may be flashed into permanent memory of the user device 104, or may be otherwise encoded on the user device 104. In an embodiment, a unique identifier of the user device 104 is embedded in one time programmable (OTP) memory of the user device 104, although, generally any way of uniquely identifying the user device 104 may be used. In an embodiment, the data store 110 maps unique identifiers of user devices with corresponding user accounts. The data store 110 may map the unique identifiers of the user devices with corresponding user accounts in any suitable manner. For example, in an embodiment, the data store 110 associates the unique identifiers with corresponding user accounts. In another embodiment, the data store 110 associates information derived based at least in part on and different from the unique identifiers with the user accounts. In this manner, storage of identifiers incorporated with user devices by the data store 110 may be avoided, thereby protecting unauthorized access of the unique identifiers should information in the data store 110 be compromised. The user accounts may be used in connection with consuming activities of the user 108, such as in connection with an electronic commerce website 112 through which the consumer orders items offered for consumption, including the user device 104.

The authentication service 102 may also communicate information needed for authentication of the user device 104 with an authenticator 107 of the remote computing service 106, where the authenticator may be a computing device or module operable to receive authentication information from the user device 104 to authenticate the user device 104. For example, in an embodiment, the authentication service 102 directs a short message service (SMS) proxy 116 to communicate a second key to a mobile device 114 of the user 108 to enable the user 108 to input information received by the mobile device 114 into the user device 104 to be used for authentication, as described below. An SMS proxy may be a device or a module executing on a device that is operable to access a mobile network to send information to the mobile device 114. A mobile telephone number for the mobile device 104 may be retrieved from the data store 110. Generally, while the present disclosure discusses providing additional authentication information to the user 104 through SMS messages sent by an SMS proxy, any method of communication and appropriate hardware may be used to communicate information to the user 104. Examples include electronic mail messages, instant messages sent according to various protocols, and the like. The SMS proxy 116 or other device may be used to communicate information to other people associated with the user 104, such as an acquaintance 118 of the user 104 (described below) to enable the acquaintance 118 to access the remote computing service 106 using an acquaintance device. For instance, the SMS proxy 116 may send a key to an acquaintance mobile device 122 that the acquaintance 118 may input into the acquaintance device 120.

As noted above, the remote computing service 106 operates a remote computing instance 109 on behalf of the user 104. A remote computing instance, in an embodiment, is a virtual machine operating on behalf of the user 108 (and, generally, may operate virtual machines on behalf of multiple users). The virtual machine of the remote computing service, in an embodiment, executes an operating system and one or more applications in the operating system according to user input by the user 108 into the user device 104. Generally, the user 108 inputs various commands using various input devices of the user device 104 and information corresponding to the commands are sent to the remote computing instance 109 of the remote computing service 106. Execution of the operating system and application(s) proceed in the virtual machine according to the received information. For instance, the remote computing instance 109 of the remote computing service 106 may open and/or modify documents according to the user commands. Information corresponding to execution of the operating system and application(s) is sent to the user device 104 for display and/or other ways of providing the information to the user. In this manner, the experience of the user 104 is substantially similar to that which would be the user's experience if the operating system and application(s) were executing on the user device.

The remote computing service 106, in an embodiment, also allows access to the remote computing instance 109 by other devices, such as the acquaintance device 120 of the acquaintance 118 of the user 104. For example, information corresponding to execution of the operating system and application(s) may be provided to the acquaintance 118 through the acquaintance device 118 in a manner similar to the way by which information is provided to the user 104. The acquaintance 118 may be, for instance, a friend of the user 104 to whom the user 104 desires to provide access to the remote computing instance of the user 104, such as guest in the user's house. As another example, the acquaintance 118 may be a technician that requires access to the remote computing instance in order to troubleshoot or otherwise provide services for the user 104. Thus, the acquaintance may have simultaneous or non-simultaneous access to the remote computing instance of the user 104. Further, various acquaintances may be provided with various levels of access to the user's remote computing instance. For instance, the user 104 may, through user input, allow a technician full access to the remote computing instance while the user 104 may provide limited access to the remote computing instance to friends, in order to prevent friends from accessing and/or modifying documents and/or installing additional applications. The user 104, for instance, may provide friends only enough access to enable the friends to utilize a browser application to view web sites and, perhaps, check an electronic mail account. Various levels of access may be provided.

The remote computing instance 109 of the remote computing service 106, in an embodiment, communicates with various data stores. For instance, in an embodiment, the remote computing instance 109 of the remote computing service 106 may communicate with an application data store 124 that stores various applications that can be installed in the operating system of the user's virtual machine. The user may, for example, use the electronic commerce website 112 to order a license of an application and the application may be installed on the user's virtual machine. In one embodiment, a key for the ordered application is sent to the user device 104 and the user device uses the key to direct the remote computing service 106 to install the application on the user's virtual machine. The key may be used to authenticate the application with a manufacturer of the application.

The remote computing instance 109 of the remote computing service 106 may, in an embodiment, communicate with a personal data store 126 that includes storage for the user 104 and perhaps other users. The personal data store 126 may, for instance, allocate storage space to documents of the user 104. The personal data store 126 or another data store may store an image of the operating system of the user's virtual machine such that, when the user is not accessing or otherwise using the virtual machine, the image may be stored and hardware resources can be utilized for other users. If the user, through user input, indicates a desire to use the operating system again, the image may be loaded on available hardware for executing the operating system, which may be different hardware than previously used.

In addition to the above, the remote computing service 106 may be separated from the authentication service 102 by a firewall 128, where a firewall is a device or module operating on a device that selectively allows communication between the authentication service 102 and the remote computing service 106. The amount of communication between the authentication service 102 and the remote computing service 106 may vary depending on the various protocols used to authenticate the user 104. In one embodiment, the authentication service 102 and remote computing service 106 are temporally synchronized, but otherwise do not communicate between themselves. The authentication service 102 provides a key according to a time-dependent key generation algorithm and the remote computing service 106, being temporally synchronized with the authentication service 102, is able to decode the key. In other words, because the remote computing service 106 is temporally synchronized with the authentication service 102, the remote computing service 106 is able to determine whether a key provided by the user device 104 is an acceptable value. In another embodiment, the authentication service 102 communicates keys passed to the user device 104 to the remote computing service 106 (or an encrypted version thereof) to enable the remote computing service 106 to authenticate the user device 104. The firewall 128, in this example, may prevent communication from the remote computing service 106 to the authentication service 102 in order to prevent malicious access to the authentication service 102 and/or the other components on the other side of the firewall 128. Generally, the firewall 128 may strengthen security by limiting communications between the remote computing service 106 and the authentication service 102 in any suitable manner.

Figure 2:
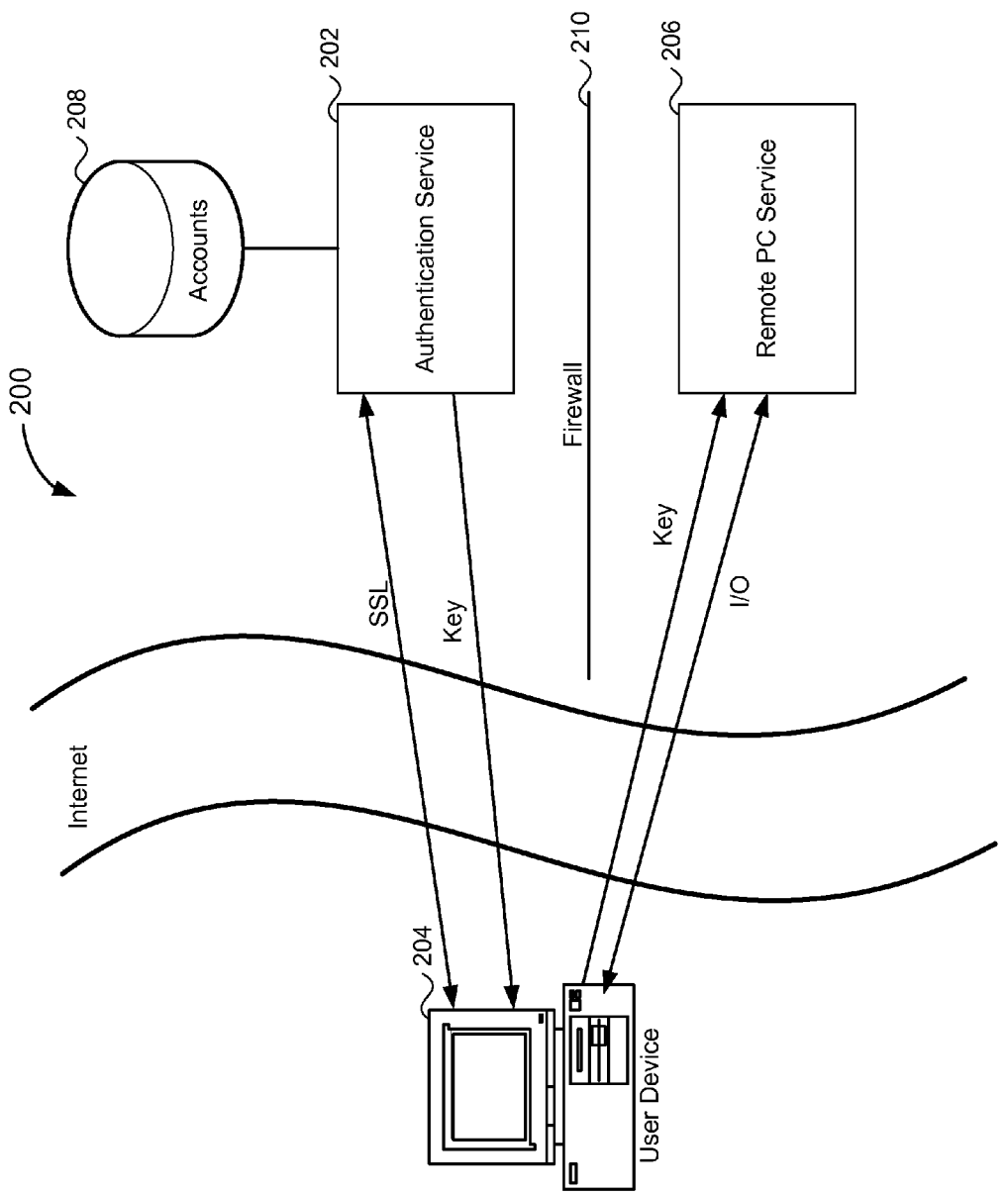
FIG. 2 shows a diagrammatic representation of a process for providing access to remote computing services, in accordance with an embodiment.

FIG. 2 shows a diagrammatic representation 200 of an illustrative example of a process that may be used in order to authenticate a user device in order to provide access to remote computing services, in accordance with an embodiment. In this example, an authentication service 202, user device 204, and remote computing service 206 communicate with one another, such as in a manner described above in connection with FIG. 1. A firewall 210 may separate the authentication service 206 from the authentication service 202. In this illustrative example, the user device 204 is operable to establish a secure socket layer (SSL) connection with the authentication service 202 upon detection of a connection to a network, such as the Internet. As an example, the user device 204 may be programmed to initiate an SSL handshake protocol by sending an appropriate request to an internet protocol (IP) address of the authentication service 202, and then completing establishment of the SSL connection. Other protocols for transmitting information may also be used. Generally, while the illustrative embodiments described herein make use of SSL communications, any suitable protocol may be used.

In an embodiment, upon establishing an SSL (or other) connection, the user device 204 sends a unique identifier of the user device 204 to the authentication service 202. The unique identifier may be information incorporated with the user device 204, such as information permanently incorporated with the user device 204 described above, and/or information derived based at least in part on and different from information permanently incorporated with the user device 204. Generally, the information sent from the user device 204 to the authentication service may be any information that allows the authentication service 202 to determine whether to provide the user device 204 information needed by the user device 204 to access the remote computing service 206. As an example, the user device 204 may send the authentication service 202 a public key or other certificate that the user device 204 has electronically signed. In an embodiment, the authentication service 202 uses the received unique identifier to reference a data store 208 in order to determine a status of a user account associated with the user device 204. For instance, a user may pay for access to the remote computing service 206 through various payment schemes (monthly payment, payment per amount of usage, and the like) and the authentication service 202 may use the data in the data store 208 in order to determine whether the user has an active remote computing service account (because he or she has fulfilled his or her part of an agreement for accessing the remote computing service 206). The authentication service 202 may generally use the received unique identifier and data in the data store 208 to make a determination whether to provide a key for accessing the remote computing service 206 to the user device 204. The authentication service may, for instance, determine not to provide a key for accessing the remote computing service 206 to the user device 204 if the authentication service cannot find the received unique identifier in the data store 208. Similarly, the authentication service 202 may use one or more algorithms to determine whether the received unique identifier was forged or is otherwise fraudulent.

If the user device 204 has been stolen, for example, the owner from whom the user device 204 was stolen may have reported the user device as stolen 204 to an entity operating the authentication service 202 (directly or indirectly) and information in the data store 208 may reflect that the user device 204 has been stolen, thereby indicating to the authentication service that a key for accessing the remote computing service 206 should not be provided. Similarly, the authentication service may use available information in one or more fraud detection algorithms to determine whether to provide a key for accessing the remote computing service 206. If an IP address of the user device, for instance, originates in a particular geographic location while other communications of the user originate from another geographic location, the authentication service 202 may determine to not provide a key for accessing the remote computing service 206. Generally, any algorithms and/or criteria may be made to determine whether to provide a key for accessing the remote computing services.

If a determination is made to provide the user device 204 a key for accessing the remote computing service 206, a key may be generated (or retrieved from a data store) and provided to the user device 204. The key may be any collection of information that at least in part enables the remote computing service 206 to determine whether to provide information corresponding to execution of the user's operating system on a virtual machine to the user. The key may be, for instance, a key generated using a public-key encryption algorithm that enables the remote computing service 206 to decrypt information that allows access to a remote computing instance of the user.

Further, as noted above, the remote computing service 206 and authentication service may be synchronized and/or coordinated. The key, therefore, may be information that the remote computing service 206, because of the synchronization and/or coordination with the authentication service 202, is able to use to determine that the authentication service 202 authorized access to the remote computing service 206. In one embodiment, for example, the authentication service 202 may send information to the remote computing service 206 identifying the user device 204 and the key sent to the user device 204 (or information from which the key sent to the user device 204 can be determined as authentic). In another embodiment, the remote computing service 206 and the authentication service 202 may be temporally synchronized and each use a time-dependent key-generation algorithm to generate sequences of keys. The time-dependent key-generation algorithm may be a pseudorandom number generation algorithm that uses a current time and a unique identifier of the user device 204 as a seed value. In this manner, the remote computing service 202 can check whether a key is authentic by determining if a key matches a key that itself has generated. As noted, the key can be any suitable information for enabling the remote computing service 206 to determine whether to provide access to the user device 204.

In an embodiment, when the user device 204 receives a key from the authentication service 202, the user device provides the key to the remote computing service 206. While not shown in the figure, the user device 204 may establish an SSL or other secure connection with the remote computing service 206 prior to transmission of the key to the remote computing service 206. Providing the key to the remote computing service 206 may be performed in any suitable manner. For example, when providing the key to the user device 204, the authentication service may also provide an IP address for the remote computing service 206. The user device 204, upon receipt of the key, sends the key to the IP address. The user device may also be preprogrammed with an IP address of the remote computing service 206. When providing the key to the remote computing service 206, the user device 204 may send other information to the remote computing service, such as a unique identifier of the user device 204 or other information identifying the user device 204 or from which the user device 204 can be identified.

Once the remote computing service 206 receives the key from the user device 204, the remote computing service 206 determines whether to provide access to the user device 204. Determining whether to provide access to the user device 204 may be performed in any suitable manner, including ways described above. Generally, the remote computing service 206 takes the received key and any other applicable information and applies a suitable algorithm for determining whether to provide access. The remote computing service 206 may, for instance, compare the key from the user device with a key received from the authentication service 202 or with a key that the remote computing service generated itself. The remote computing service 206 may use other information, such as an IP address of the user device, a time, or, generally, any available information to make its determination whether to provide access to the user device 204. If the remote computing service 206 determines to not provide access to the user device 204, then the remote computing service 206 may do nothing, send a message to the user device 204 stating that it has denied access and/or a reason for the denial, or, generally, may take any suitable action, including attempting to re-authenticate the user device.

If, on the other hand, the remote computing service 206 determines to provide access to the user device 204, the remote computing service 206 then provides access to the user device 204. In an embodiment, providing access to the user device 204 includes receiving input from the user device 204 and providing output to the user device 204 and, generally, executing an operating system and possibly additional applications for the user on a virtual machine, such as in a manner described above. If various access levels are used, the remote computing service 206 may provide access to the user device 204 according to a level of access established during authentication.

Variations of the method described above and, generally, of methods described herein are contemplated as being within the spirit of the present disclosure. For instance, in an embodiment, the key provided to the user device 204 from the authentication service 202 may be valid for accessing the remote computing service for a limited period of time. The user device may be programmed to re-request a new key from the authentication service 202 in order to maintain access to the remote computing service 206. The authentication service 202 may make another determination whether to provide a key to the user device 204 and, if applicable, provide another key that the user device 204 can use to authenticate itself with the remote computing service 206. In this manner, a user can continue using the remote computing service 206 as long as the authentication service 202 provides keys for access to the remote computing service. Thus, if some event causes the authentication service 202 to not provide a key to the user device 204 (such as report of the user device 204 as stolen or lost), the user device 204 will eventually lose the ability to operate the operating system at the remote computing service 206. At the same time, as long as the authentication service 202 continues to provide keys to the user device, the user experiences continuous use of the remote computing service 206.

Figure 3:
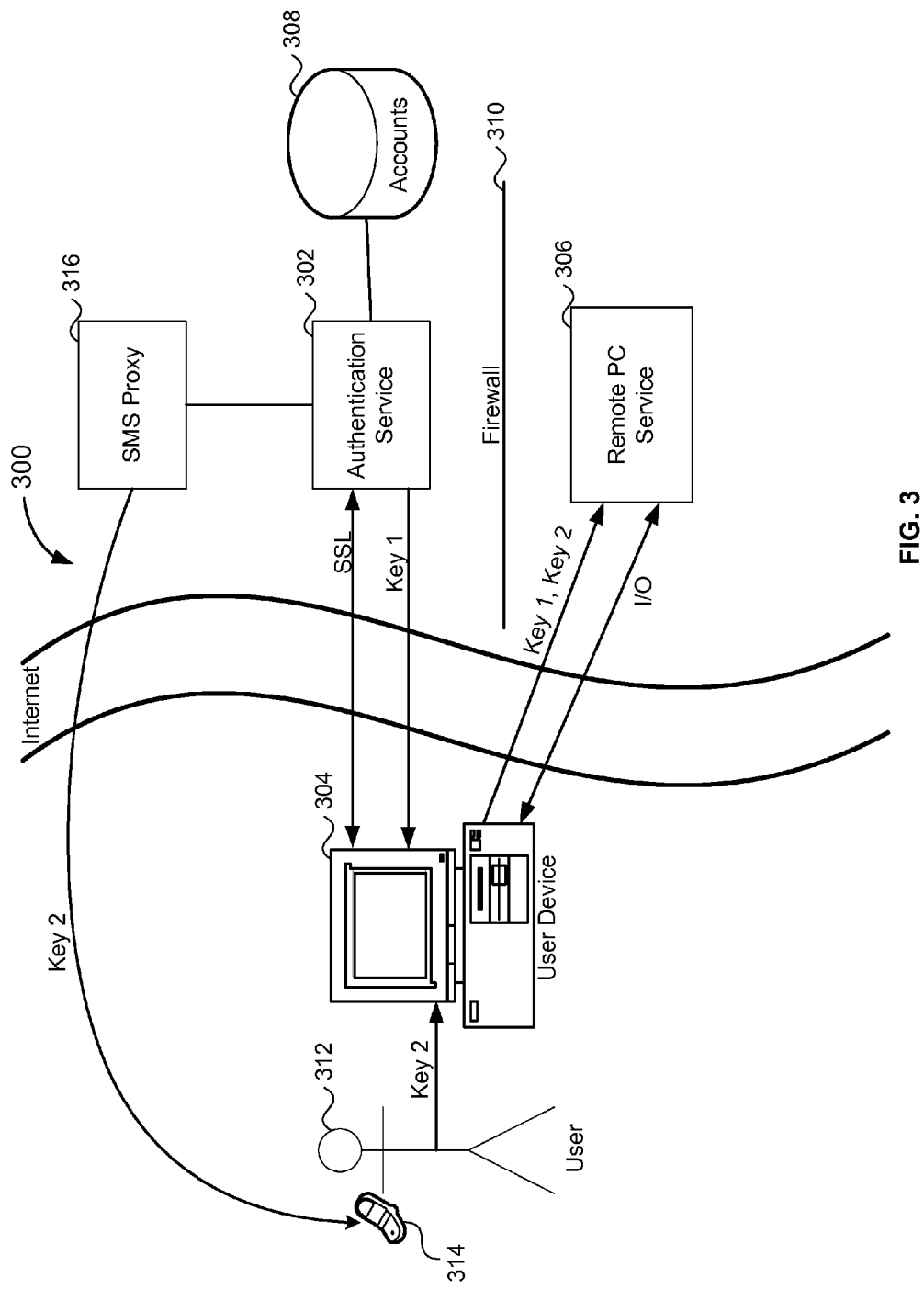
FIG. 3 shows a diagrammatic representation of a process for providing access to remote computing services, in accordance with another embodiment.

FIG. 3 shows a diagrammatic representation 300 of an illustrative example of a process that may be used in order to authenticate a user device in order to provide access to remote computing services, in accordance with an embodiment. The process shown in FIG. 3 may be used in order to provide additional security by requiring additional steps for authentication, as described more completely below. In this example, an authentication service 302, user device 304, and remote computing service 306 communicate with one another, such as in a manner described above in connection with FIGS. 1-2. A firewall 310 may separate the authentication service 306 from the authentication service 302.

The user device 304 may establish an SSL connection or other connection with the authentication service 302, such as in a manner described above. Upon establishing the SSL connection, the authentication service 304 may utilize information received from the user and information in a data store 308—which may contain information relating to an account of a user 312 of the user device 304, such as in a manner described above—in order to make a determination whether to provide a key for accessing the remote computing service 306, such as in a manner described above. If the authentication service 302 determines to provide a key to the user device 304, then the authentication service 302, in an embodiment, provides a first key to the user device 304. The first key may be, for instance, a key in accordance with the above description.

In an embodiment, if the authentication service 302 determines to provide a key to the user device 304, then the authentication service 302 also provides a second key to a mobile device 314 of the user 312 of the user device 304. The authentication service 302 may, for instance, send instructions to an SMS proxy 316 to send a second key to the mobile device 314 of the user 312. The instructions from the authentication service 302 to the SMS proxy 316 may include information identifying the second key and a telephone number of the mobile device 314. The telephone number may be accessed from the data store 308 or provided as input from the user 312 into the user device 304, or be provided to the SMS proxy in any suitable manner. The second key may be any collection of information that the user 312 may input into the user device 304 and may be a key similar to any of the keys described above. In an embodiment, the second key is generated using a time-dependent key-generation algorithm that produces a string of numbers and/or letters. The second key, in an embodiment, is shorter than the first key in order to make it less burdensome for the user 312 to transfer to the user device 304. Transferring the second key to the user device 304 may be accomplished in any suitable manner. In an embodiment, the user 312 provides input into the user device 304 corresponding to the second key. The second key may also be transmitted to the user device through a direct wire connection (such as a Universal Serial Bus (USB) connection), using a wireless protocol, or, generally, in any suitable manner.

In an embodiment, when the user device 304 has received the first key and the second key, the user device 304 sends the first key and the second key (or information derived therefrom) to the remote computing service 306. The user device may provide the first key and the second key simultaneously or at different times, such as upon receiving each. The remote computing service 306, in an embodiment, uses the first key and second key received from the user device 304 and, if applicable, any other additional information, to determine whether to provide access to the user device 304, such as in a manner described above. If, in an embodiment, the remote computing service 306 determines to provide access to the user device 304, then the user device 304 is provided access to the remote computing service 306, such as in a manner described above.

In the illustrative example of FIG. 3, additional authentication steps in connection with the mobile device 314 of the user 312 help ensure that access to the remote computing service 306 is properly given. For example, if someone attempting to operate the user device 304 does not also have a mobile device with a number associated with the user device 304, then that person may be unable to use the user device 304. In this manner, stealing the user device 304 is less desirable since the user device 304 may not be particularly useful without access to the remote computing service 306.

As noted, variations of the process illustrated in FIG. 3 and of other processes described herein and variations thereof are contemplated as being within the scope of the present disclosure. For instance, FIG. 3 shows a mobile device 314 that is used to enable the user 312 to provide a second key to the remote computing service 306. Other devices may be used as alternatives to or in addition to the mobile device 314. For instance, the user 312 may have an RSA® key fob provided from EMC Corporation, where the key fob periodically generates keys in synchronization with the remote computing service 306. When the user 312 desires to access the remote computing service 306, the user 312 may provide a current key displayed on the key fob to the remote computing service 306, which the remote computing service 306 can authenticate by having generated the same key at the same time, or in accordance with other suitable methods. Generally a second (or third or more) key may be provided to the user in any suitable manner, such as by electronic mail, instant message, automated telephone call, or in other ways. In an embodiment, the user 312 may choose (either at initial account setup or at the proximate to the time of access to the remote computing service 306) a method of receiving the second key. For instance, if the user 312 is not near his or her mobile device, he or she may select receiving the key by electronic mail that he or she may access using another device, such as another computing device available to the user 312. Similarly, if the user 312 does not wish to be charged for an SMS message, he or she may select receipt of the second key by electronic mail which he or she may receive on the mobile device without additional charges.

Figure 4:
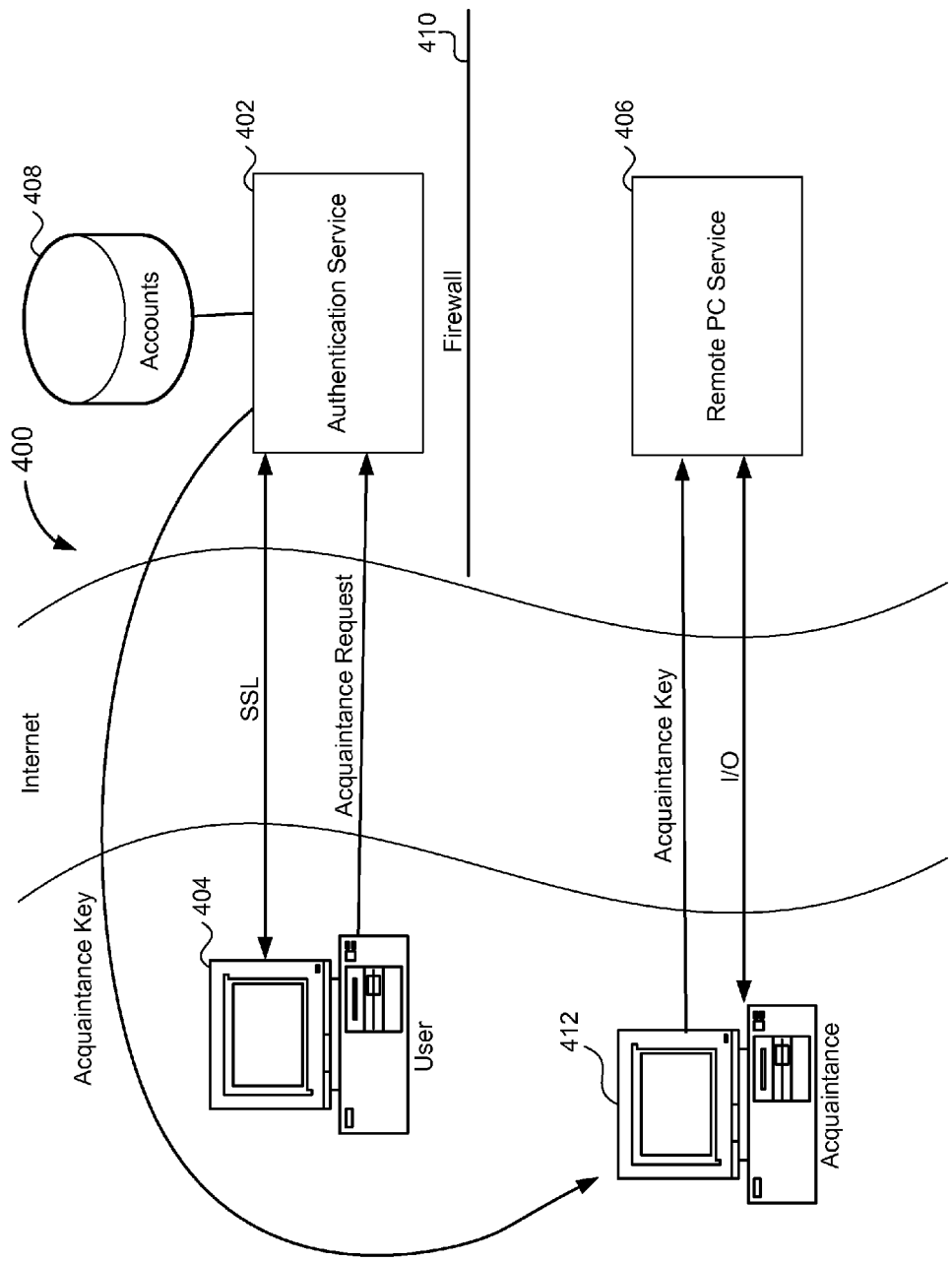
FIG. 4 shows a diagrammatic representation of a process for providing access to remote computing services, in accordance with yet another embodiment.

In some instances, users may want to provide access to their operating system of a remote computing service. Guests of the user, for instance, may need access to the Internet in order to check an electronic mail account, visit one or more websites, or otherwise perform computing-related tasks. As another example, a user may wish to provide access to his or her operating system in order to allow someone to troubleshoot and/or repair any problems with the applications or applications installed thereon, or to train or receive training. Accordingly, FIG. 4 shows a diagrammatic representation 400 of an illustrative example of a process that may be used to provide third party access to a user's operating system, in accordance with an embodiment. In this example, an authentication service 402, user device 404, and remote computing service 406 communicate with one another, such as in a manner described above in connection with FIGS. 1-2. A firewall 410 may separate the authentication service 406 from the authentication service 402.

The user device 404 may establish an SSL connection or other connection with the authentication service 402, such as in a manner described above. Upon establishing the SSL connection, the authentication service 404 may utilize information received from the user and information in a data store 408, such as data described above, to make a determination whether to provide a key for accessing the remote computing service 406, such as in a manner described above. If the authentication service 402 determines to provide a key to the user device 404, then the authentication service 402, in an embodiment, provides a key to the user device 404, which may be any key described above. The key received by the user device 404, in an embodiment, is used to authenticate the user device 404 with the remote computing service 406, such as in a manner described above. Additional authentication steps, such as steps described above, may be used in addition. Once authenticated with the remote computing service 406, the user device 404 accesses the remote computing service 406, such as in a manner described above, such as by transmitting user input to the remote computing service 406 and receiving information corresponding to execution of the operating system and any applications executing on the operating system.

If the user of the user device 404 desires to provide another access to his or her operating system of the remote computing service 406, in an embodiment, the user 404 submits a request for an acquaintance key to the authentication service 402. In an embodiment, the user of the user device 404 directs the user device 404 to submit an electronic request to the authentication service 402. The request may include information identifying an acquaintance device 412, such as an IP address of the acquaintance device 412, or other unique identifier of the acquaintance device 412, although the request may not include such information in various embodiments. Upon receiving the request, the authentication service 402 generates or retrieves from storage an acquaintance key and sends the acquaintance key to the acquaintance device 412. The authentication service 402 may, for instance, send the acquaintance key to an IP address of the acquaintance device, to an electronic mail address of the acquaintance, or in any suitable manner. In other words, while shown as such in FIG. 4, the acquaintance key need not be provided directly to the acquaintance device, but may be provided indirectly to the user device, such as to a mobile device of the acquaintance. While not shown in the figure, the acquaintance device may establish an SSL or other secure communication channel with the authentication service 402 prior to receiving the acquaintance key.

In an embodiment, when in possession of the acquaintance key, the acquaintance device 412 uses the acquaintance key to authenticate itself with the remote computing service 406. Once authenticated with the remote computing service 406, the acquaintance device 412 may access the operating system associated the user of the user device 404 that is executing in the remote computing service 406. For instance, in one embodiment, the acquaintance device is able to provide input of the acquaintance in order to direct, at least in part, execution of the operating system executing and any applications installed on the operating system in a virtual machine of the remote computing service. Information corresponding to the operating system and the application of the operating system may be provided to the acquaintance device 412, such as in a manner that such information is provided to the user device 404, described above.

Many variations of the process shown in FIG. 4 are considered as being within the scope of the present disclosure. For instance, the user device 404 and the acquaintance device 412, in an embodiment, are both able to provide input and receive output from the remote computing service 406. In other words, the acquaintance device 412 and user device 412, in an embodiment, display the same or substantially the same information simultaneously or nearly simultaneously. The user would see the effect of acquaintance input to the remote computing service 406 and the acquaintance would see the effect of user input to the remote computing service. Such a setup may be useful when the acquaintance using the acquaintance device 404 is providing assistance to, providing training to, or receiving training from the user of the user device 404. In another embodiment, the user and the acquaintance may not access the remote computing service 406 simultaneously, but the acquaintance may access the remote computing service 406 instead of the user. For example, the acquaintance may be considered to "borrow" the user's virtual machine of the remote computing service 406. In such an embodiment, or in any embodiment, the acquaintance may be provided with various levels of access, such as in a manner described above.

In addition to the foregoing, while not shown, additional authentication steps may be performed in connection with the process shown in FIG. 4, such as in a manner described above. The user and/or acquaintance may be required to provide a second key generated in accordance with the above description, for example. As another example of a variation considered being within the scope of the present disclosure, while shown as two separate devices in FIG. 4, the acquaintance device 412 and user device 404 may be the same device. Such a scenario may be useful, for instance, when providing a guest use of the user device 404. As yet another example, the authentication service 402 may not provide an acquaintance key to the acquaintance device 412, but the user device, responsive to user input, may simply instruct the remote computing service 406 to allow the acquaintance device to authenticate itself.

In one embodiment, a user is able to use his or her mobile device to send an SMS message to an SMS proxy associated with the authentication service 402 that is operable to receive text messages. The SMS proxy may, responsively and in communication with the authentication service 402, send an SMS message to the mobile device of the user with a key that the user may forward to one or more acquaintances to allow the acquaintance(s) to access the user's virtual machine, either simultaneously with the user or not. The SMS proxy or another device may also send an SMS or other message to one or more acquaintances directly, such as if the user provides appropriate information for doing so.

Figure 5:
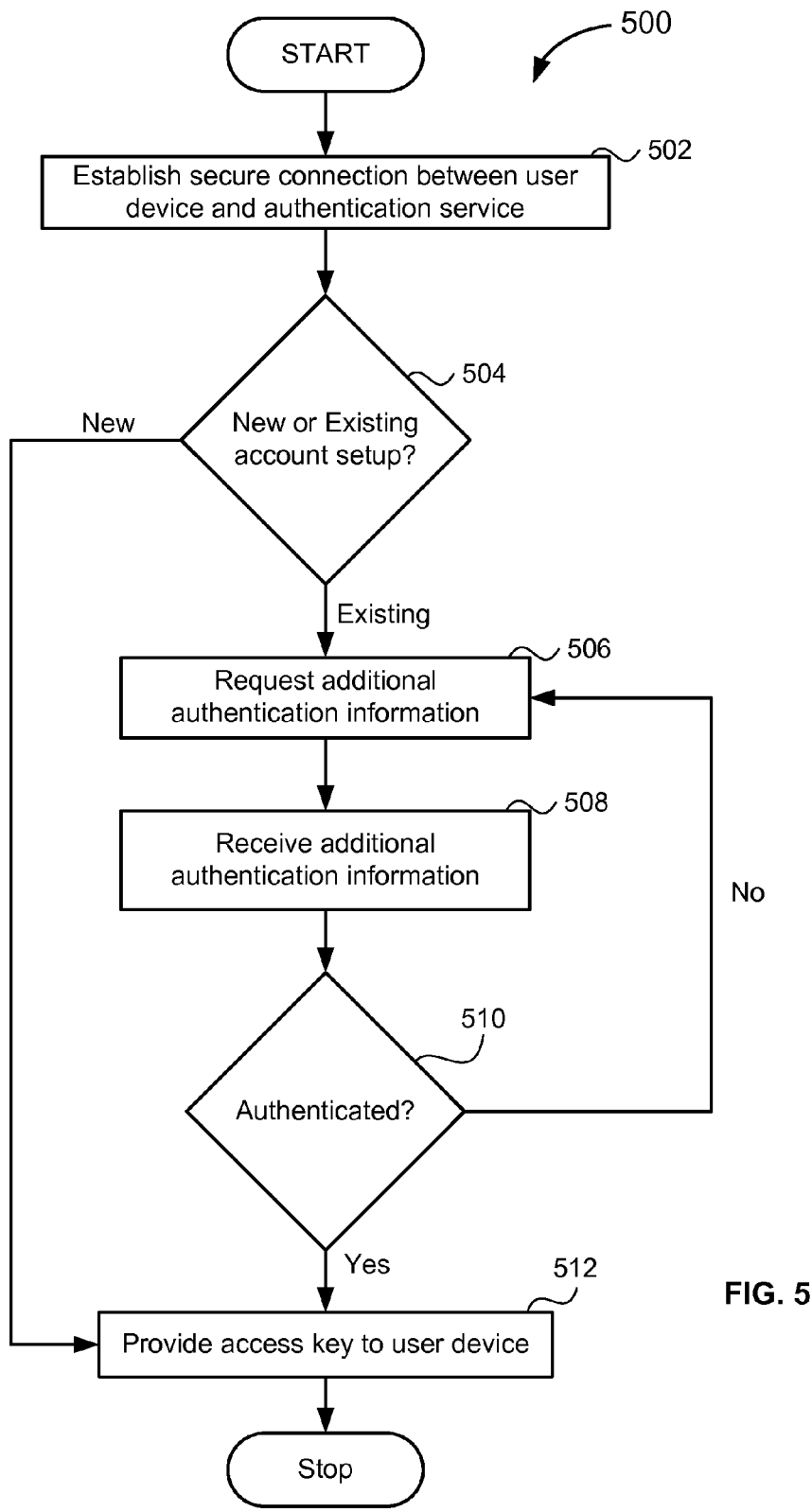
FIG. 5 shows a flowchart for a process for varying the amount of authentication required to access remote computing services, in accordance with an embodiment.

Various embodiments described herein provide for easy access by users to remote computing services. In some instances, it may be desirable to make user access of remote computing services as easy as possible, while still maintaining an acceptable level of security to protect user information. Accordingly, FIG. 5 provides an illustrative example of a flowchart for a process 500 that may be used to vary the amount of authentication required. Portions of the process 500 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors.

In an embodiment, a secure connection between a user device and an authentication service, such as an authentication service described above, is established 502. Establishing the secure connection may be accomplished in any suitable manner, such as by establishing an SSL connection. The user device may be a user device such as one described above. In an embodiment, once the secure connection between the user device and the authentication service is established, a determination is made 504 whether the user device is to be used with a new account setup or an existing account setup. A user may have a new account setup when he or she accesses the remote computing service for the first time. With a new account setup, for instance, an operating system for the user may be in a newly-installed state where the user may have to input user preferences, create accounts for the operating system, and the like. A new account setup may also include storage of a minimal amount of data stored for the user since the user has not utilized the operating system to any significant extent, if at all, and, therefore, has not had an opportunity to cause personal information about the user to be stored in connection with the remote storage service. As an example of when a user may have a new account setup, a user device may have been provided to the user with a limited time (such as thirty-day) trial for access to the remote computing service and possibly one or more applications. A user with an existing account setup may have already accessed the remote computing service, perhaps with the same or another device. Thus, a user with an existing account setup may have documents remotely stored and accessible by accessing an operating system for the user. A user may have a new account setup, for example, upon ordering a user device from an electronic commerce website operated in connection with the remote computing service. As an example of when a user may have an existing user account setup, the user may have previously accessed the remote computing service during a trial period, or otherwise. If the trial period has ended, a setup for the user may be stored for a limited time, such as six months, so that, if the user eventually changes his or her mind about using the remote computing services, an account setup, including any documents the user has created, is available to the user.

Determining whether the device is to be used for a new account setup or an existing account setup may be performed in any suitable manner. In an embodiment, determining whether the device is for a new account setup or existing account setup is performed, at least in part, by accessing a data store that contains information about whether the user acquired the device for a new or existing account setup. Alternatives or additions to the above for determining whether the device is to be used for a new or existing account include determining a state of an operating system setup for the user on the remote computing service, determining whether a user associated with the user device has accessed the remote computing service before, determining whether the user has accessed a specific operating system setup of the user on the remote computing service before, and/or making other determinations.

In an embodiment, if it is determined that the user device is to be used with an existing account setup, additional authentication information is requested 506. Additional authentication information may be a username and password of a user account, which may be used to access an electronic commerce website operating in connection with the remote computing service. Additional authentication information may also be information described above, such as information provided to the user on a mobile device of the user, or otherwise. If the user provides the additional authentication information, in an embodiment, the additional authentication information is received 508 by the authentication service. The additional authentication information, for example, may be input by the user into the user device, which may send the information, possibly encrypted, to the authentication service over a communication network.

When the additional authentication information is received, in an embodiment, a determination is made 510 whether the user device is authenticated, based at least in part on the additional authentication information. If the user device is not authenticated, then the authentication service may re-request additional authentication information, simply do nothing, or take other appropriate action. If the user device is authenticated or if a determination was made 504 that the user device is to be used with a new account setup, in an embodiment, the authentication service provides an access key to the user device, such as in a manner described above. The authentication service may provide additional keys, such as a key to a mobile device or in another manner described above. The key(s) provided to the user and/or user device may allow the user device to access the remote computing service, such as in a manner described above.

In this manner, less authentication is required when the user device is to be used with a new account instance than if the user device is to be used with an existing account instance. Thus, in an embodiment, users may order a user device and, upon receipt, connect the user device to the Internet in order to access the remote computing service. This allows first-time users to access their operating system on the remote computing service without unnecessary authentication or setup steps required of the user. Further, even though a user of a new account setup is required to minimally authenticate, there is minimal risk to the user since the user has not had the opportunity to store any personal or confidential information using the remote computing service. At the same time, after users have had an opportunity to access the remote computing service, more authentication is required in order to more securely protect the users' information. Further, each user may have an opportunity to change the amount of authentication required and/or the manner in which authentication is performed.

As discussed, variations of the embodiments described and suggested above are considered as being within the scope of the present disclosure. For instance, the above descriptions are provided as illustrative examples and additional features may also be provided. In an embodiment, for example, users may be able to prevent access by their devices to a remote computing service using a mobile phone, a web browser, or otherwise. In this manner, if a user device is lost or stolen, the user may prevent anyone from accessing personal and/or confidential information stored about the user. Upon recovery or replacement of the device, the user's files, settings, and such are stored in the remote computing service to enable the user to continue use of the remote computing service as before. In addition to the above, additional storage solutions may be provided in connection with an operating system of the user. Various cloud storage solutions may be utilized in connection with the user's virtual machine to provide users various storage services, such as automatic backup and unlimited storage capacity.

Figure 6:
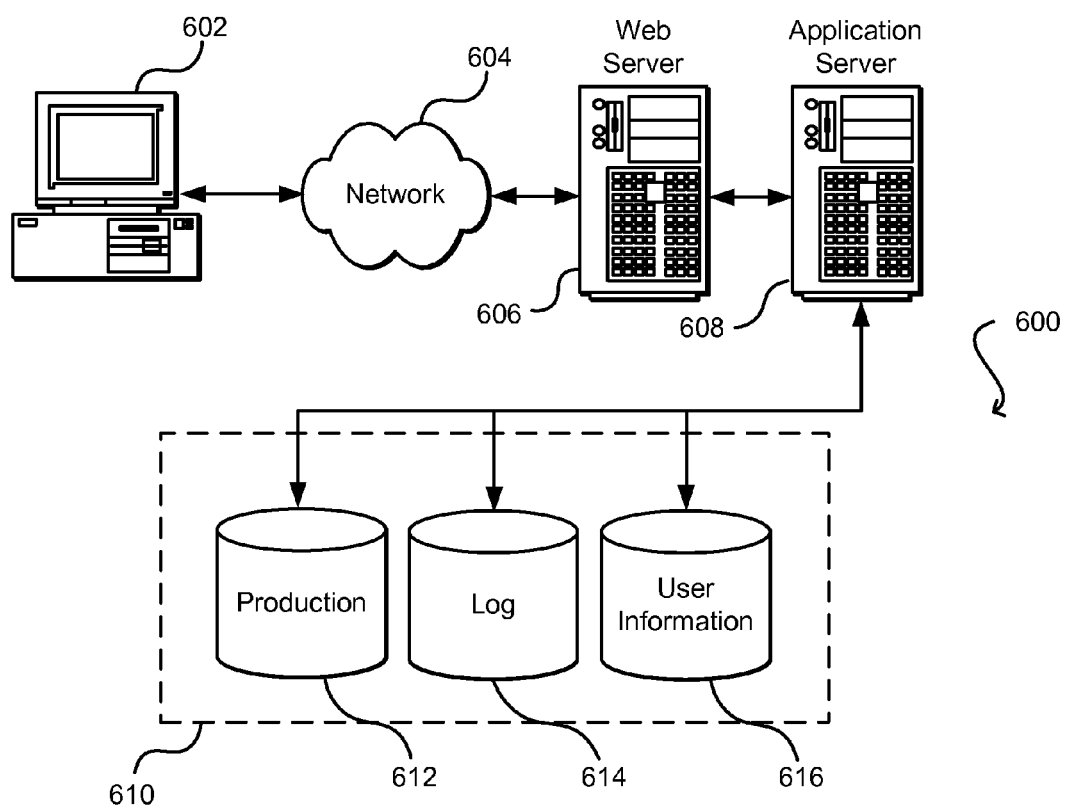
FIG. 6 illustrates an environment in which various embodiments can be implemented and that includes one or more components that may be used to implement embodiments illustrated in FIGS. 1-5.

FIG. 6 illustrates an example of an environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. The application server 608 may be used to execute an operating system on a virtual machine on behalf of one or more users and may communicate directly with the client device 602, that is, without communicating through the web server 606. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases, or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system for providing remote computing services, comprising:
an authentication service operable to, at least:
determine whether to provide a user device access to a virtual machine,
perform an initial authentication of the user device, and
transmit a first key to the user device based at least in part on the initial authentication;
one or more computing devices located remotely from the user device and collectively operable to, at least:
receive the first key from the user device, and
authenticate the user device as authorized to access the virtual machine using the received first key;
a messaging service operable to, at least:
transmit a second key to the user device, the second key usable to access the virtual machine, wherein the one or more computing devices are collectively operable to receive the second key, and wherein the second key is generated using a key-generation algorithm; and
a remote computing service operable to, at least:
receive the second key from the user device, and
authenticate the user device as authorized to access the virtual machine, based at least in part on both the received first key and the received second key.

2. The system of claim 1, wherein the authentication service is further operable to receive from the user device a key request that includes data derived from information incorporated with the user device.

3. The system of claim 1, wherein the authentication service is further operable to, responsive to receiving a key request from the user device, transmit the first key to the user device.

4. The system of claim 1, wherein the one or more computing devices located remotely from the user device are further operable to maintain a plurality of virtual machines corresponding to a plurality of user devices.

5. The system of claim 4, further comprising:
a data store that associates a plurality of user accounts with the plurality of user devices, the plurality of user devices including the user device from which a key request was received, and wherein the authentication service is further operable to:
at a time after receipt of the key request, access the data store to determine a status of the user account associated with the user device, wherein transmitting the first key to the user device is conditional on the account status.

6. The system of claim 5, wherein the data derived from information embedded in the user device includes a unique identifier of the user device, and wherein the authentication service uses the unique identifier to determine the status of the user account.

7. The system of claim 1, wherein the one or more computing devices located remotely from the user device are further operable to:
execute an operating system for the user device; and
provide results of executing the operating system to the user device.

8. One or more computer-readable storage media having collectively stored thereon instructions for causing a computer system to perform a method, the computer system including a first subsystem and a second subsystem, the method comprising:
determining whether to provide a user device with access to a virtual machine;
transmitting, by the first subsystem and responsive to the determination to provide the user device with access to the virtual machine, a first key to the user device, the first key transmitted to the user device based at least in part on an initial authentication of the user device;
receiving, by the second subsystem, the first key from the user device;
receiving, by the second subsystem, a second key from the user device, the second key usable to access the virtual machine, wherein the second key is generated using a key-generation algorithm; and
authenticating, by the second subsystem, the user device as authorized to access the virtual machine using the received first key and the second key.

9. The one or more computer-readable storage media of claim 8, wherein an authentication of a second user device is based in part on receiving a request for an acquaintance key from the user device, and receiving the acquaintance key from the second user device.

10. The one or more computer-readable storage media of claim 9, further comprising:
maintaining a plurality of virtual machines corresponding to a plurality of user devices, wherein the virtual machine is included with the plurality of virtual machines and wherein the second user device is not included with the plurality of user devices.

11. The one or more computer-readable storage media of claim 8, wherein the determination whether to provide the user device with access to the virtual machine is based at least in part on information embedded with the user device.

12. The one or more computer-readable storage media of claim 8, further comprising:
at a time after the user device is authenticated by the second subsystem, executing an operating system for the user device;
providing information corresponding to the execution of the operating system to the user device; and
at a time after a second user device is authenticated, providing information corresponding to execution of the operating system on the virtual machine to the second user device.

13. A user device for accessing a remote computing service, comprising:
at least one processor; and
memory, including instructions executable by the at least one processor that cause the user device to, at least:
provide information based at least in part on information embedded in the user device to a first computer system;
receive, from the first computer system, a first key, the first key received at the user device after a determination to provide the user device with access to a virtual machine is performed by the first computer system, the determination based at least in part on data derived from the information embedded with the user device;
receive a second key, the second key generated using a key-generation algorithm to allow the user device access one or more applications provided by the virtual machine; and
provide the first key and the second key to a second computer system for authentication of the user device by the second computer system as authorized to access the virtual machine.

14. The user device of claim 13, wherein the instructions further cause the user device to:
detect a connection to a network; and
at a time after detection of the connection to the network and before receiving the first key, send, to the first computer system, a key request including the information derived from the information embedded with the user device, wherein the key request causes the user device to receive the first key in response to the key request.

15. The user device of claim 13, wherein the instructions cause the user device to:
   detect a connection to a first network; and
   upon the detection of the connection, send a key request and information derived from the information embedded with the user device to a second network.

16. The user device of claim 15, wherein the second network is a pre-programmed network location stored in the memory.

17. The user device of claim 13, wherein the instructions further cause the user device to, at a time after the authentication, provide information corresponding to user input to the second computer system in order to control an operating system executing on the second computer system.

18. The user device of claim 13, wherein the user device further comprises a display device, and the instructions further cause the user device to:
   modify a display of the display device according to received information corresponding to operation of an operating system on the virtual machine.

19. The user device of claim 13, wherein the user device is incapable of executing an operating system.

20. The user device of claim 13, wherein the user device further comprising an input device, and the executable instructions further cause the user device to:
   receive authentication input from the user using the input device; and
   provide the received authentication input to the second computer system for authentication with the key.

21. A computer-implemented method, comprising:
   under the control of one or more computer systems configured with executable instructions,
      determining, at an authentication service, whether to provide access to a remote computing service distinct from the authentication service, the remote computing service configured to maintain virtual machines corresponding to authorized user devices;
      receiving, at the remote computing service, a request for access to the remote computing service from a user device, the request for access including an access key and a second key provided by the user device, the access key provided by the authentication service, wherein the second key is generated using a key-generation algorithm;
      authenticating, at the remote computing service, based at least in part on the received information, the user device as authorized to access at least one virtual machine maintained by the remote computing service;
      at a time after the user device is authenticated, receiving, at the authentication service, a request for an acquaintance key;
      authenticating, based at least in part on the acquaintance key, an acquaintance device as authorized to access the at least one virtual machine; and
      at a time after the acquaintance device is authenticated, granting access to the at least one virtual machine.

22. The method of claim 21, further comprising:
   at a time after the user device has been authenticated, providing access to the remote computing service by, at least:
      receiving, from the user device, first information identifying user input made in connection with the user device;
      receiving, from the user device, second information permanently embedded in the user device;
      executing, based at least in part on the received first and second information, an operating system, the operating system including a graphical user interface; and
      enabling the user device to display the graphical user interface of the operating system.

23. The method of claim 21, further comprising:
   at a time before receiving the request for access to the remote computing service from the user device, receiving, at the authentication service, an access key request from the user device, the access key request including data derived from information permanently embedded in the user device.

24. The method of claim 23, wherein the determination whether to provide access to the remote computing service distinct from the authentication service is based at least on the access key request.

25. The method of claim 21, further comprising:
   at a time after the determination has been made to provide access to the remote computing service, transmitting, from the authentication service, the access key to the user device.

* * * * *